3,196,892
WATER CONDITIONING AND PROPORTIONING SYSTEM
Robert H. Savage, Downey, and Walter M. Kofford, Fullerton, Calif., assignors to Water Chemists, Inc., Los Angeles, Calif., a corporation of California
Filed Dec. 9, 1960, Ser. No. 74,988
14 Claims. (Cl. 137—114)

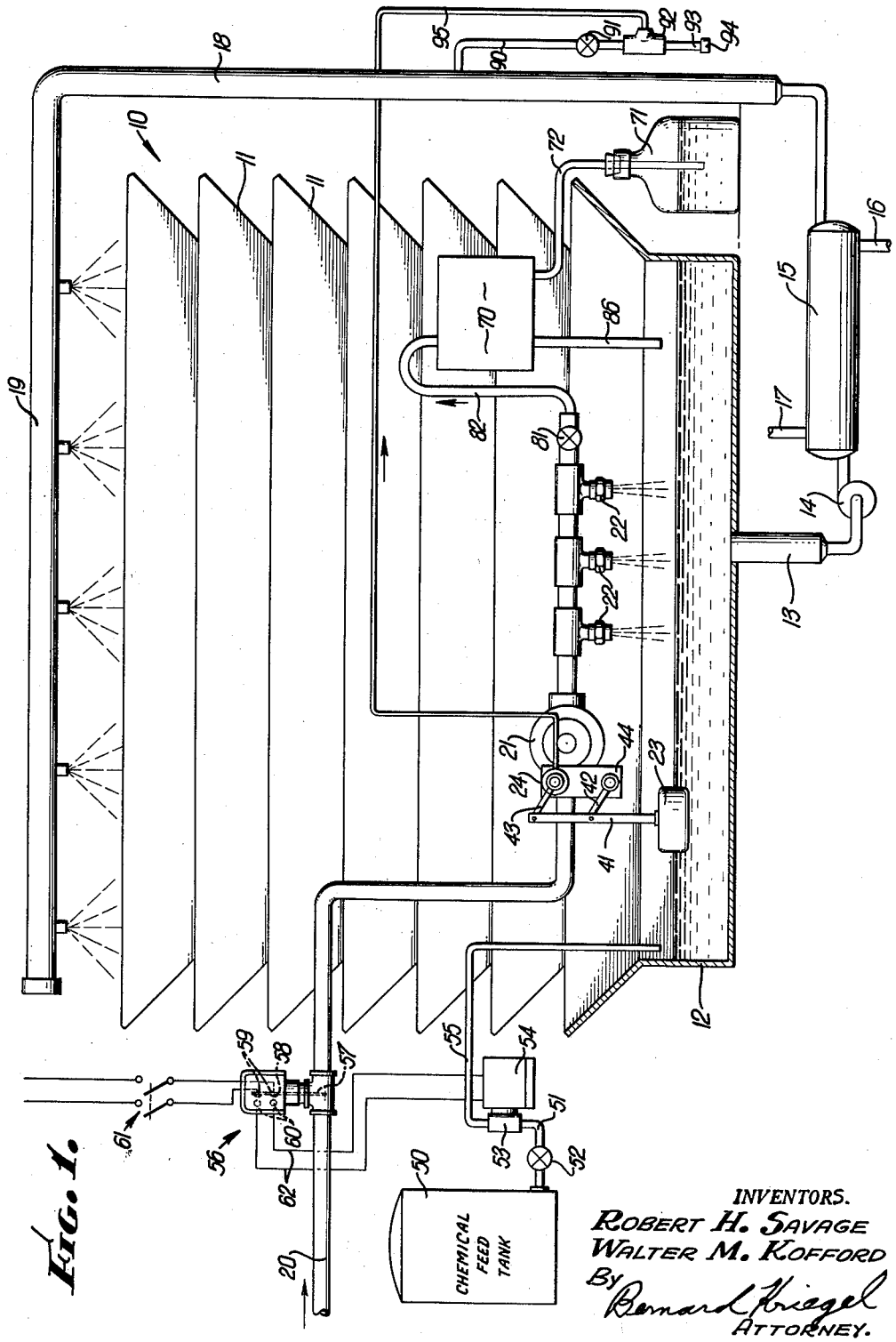

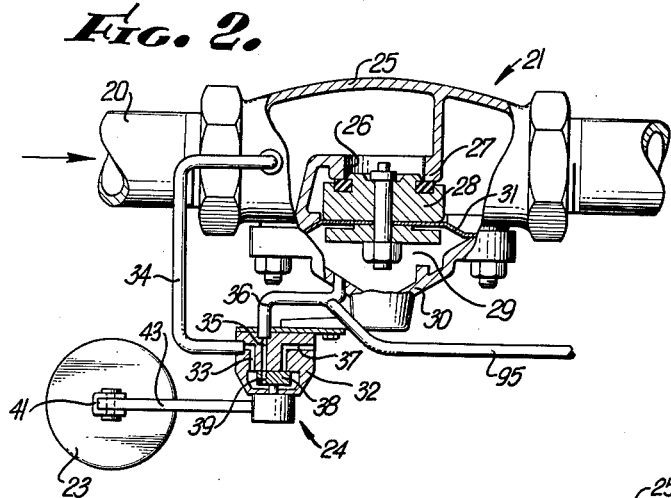
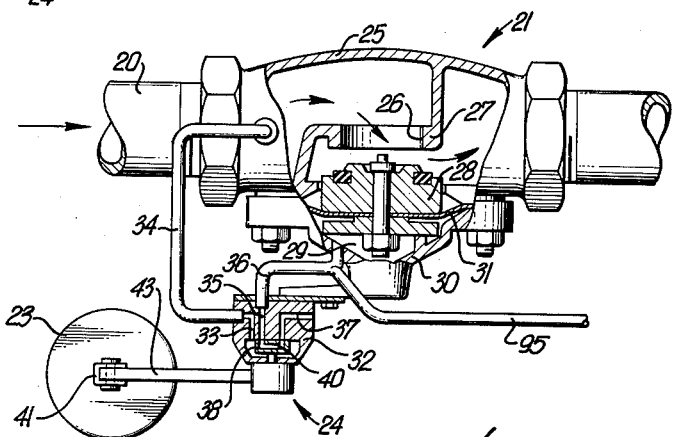
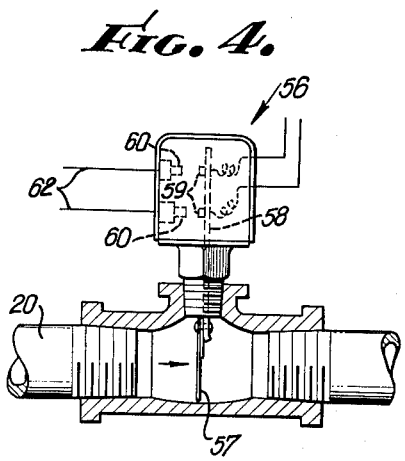
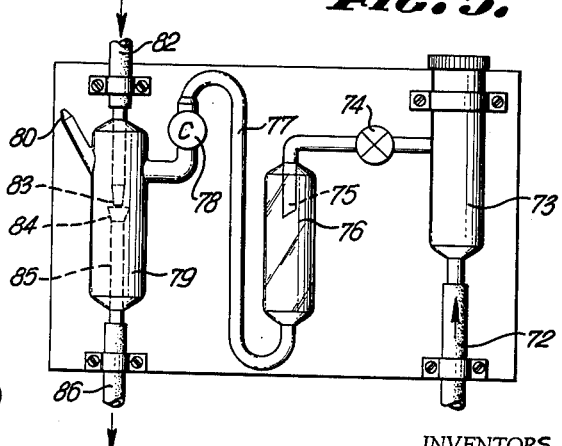

The present invention relates to the treatment of water, and more particularly to the treatment of water that is being recirculated.

In recirculating cooling water systems, chemicals are added to the recirculated water to prevent scaling, corrosion, algae formation, and the like. Usually, part of the circulating water is bled off to prevent excessive concentration of minerals in the water due to evaporation losses. Heretofore, control of the concentration of the treating chemicals in the water and its mineral concentration has required the use of relatively expensive and complex systems, particularly when control within fairly narrow limit is desired.

Accordingly, it is an object of the present invention to provide a relatively inexpensive system for controlling automatically the addition of chemicals to the water in the required proportions and for automatically bleeding off or wasting a predetermined proportion of the water to avoid excessive concentration of minerals therein.

Another object of the invention is to provide a water conditioning system that automatically adds a chemical or chemicals to the water in proportion to the make-up water added, and which effects a bleed-off of circulating water automatically in proportion to the added make-up water.

A further object of the invention is to provide a water conditioning system in which make-up water is added automatically to the system, and in which the flow of make-up water automatically causes and controls the addition of chemicals in proper proportion to the water in the system, and also automatically effects a bleed-off of water from the system in a desired proportion to the make-up water being added.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a diagrammatic view of a water conditioning system embodying the invention;

FIG. 2 is a side elevational view, partly in section, of a flow controlled hydraulically operated valve device used in the system, in closed condition;

FIG. 3 is a view similar to FIG. 2 with the valve in its opened condition;

FIG. 4 is a longitudinal section, partly in side elevation, of a flow controlled switch employed in the system;

FIG. 5 is a side elevation of an aspirator pump forming part of the illustrated system.

The water conditioning system illustrated in the drawings as exemplifying the invention includes a cooling tower 10 through which water to be cooled will flow downwardly through the cooling tower louvers 11 and into a cooling tower basin or reservoir 12. This water is drawn from the basin through a suction or cold water line 13 by means of a motor driven pump 14 that discharges it through a condenser 15 for the purpose of cooling another fluid medium. As shown, the medium to be cooled can pass into the condenser through an inlet line 16 and discharge therefrom through an outlet line 17, the heat of this fluid medium being picked up by the cooling water, which then flows upwardly through the water return line 18 to a distribution header 19 at the top of the cooling tower, from which the water sprays downwardly along the cooling tower louvers 11. Ambient air passes through the louvers and cools the water, the cool water dropping into the lower cooling tower basin 12.

For the purpose of preventing scaling and corrosion in the system, as well as the formation of algae and other undesired substances, it is desired to add certain chemicals to the water, such as acids, polyphosphates, chromates, and various other corrosion inhibitors. Moreover, make-up water is also added to the system at a substantially constant rate. A certain proportion of the water in the system is bled off to a sump or drain pipe (not shown) at a substantially constant rate so as to prevent relatively high mineral concentrations in the water. The addition of the chemicals and the bleeding off of a portion of the water in the system are performed automatically in the present case, the quantity of water bled off having a desired ratio or proportion to the quantity of make-up water added, and the chemical or chemicals fed into the water also being in a desired proportion to the quantity of make-up water.

As disclosed, the make-up water passes from a suitable supply, typically a water supply main containing water at a certain pressure, through a water inlet pipe 20 and through a hydraulically operated valve 21 into one or a plurality of flow controllers 22, each of which includes an orifice through which the water will pass into the cooling tower basin. The quantity of make-up water added through the orifices 22 is determined by the position of a float 23 buoyant in the water in the basin 12, which controls a pilot valve 24 that determines the opened and closed condition of the hydraulically operated valve 21. Any suitable valve arrangement can be used. It is preferred that the float 23, when in a predetermined lower position in the cooling tower basin 12, will effect full opening of the hydraulically operated valve 21 and such full opening will be maintained until the water in the basin rises to a predetermined upper level, carrying the float 23 upwardly with it at which time the valve 21 will be closed. Thus, the hydraulically operated valve 21 is either in its fully opened condition or in its fully closed condition, depending upon the water level in the cooling tower basin or sump 12.

As shown by way of example in the drawings, and particularly in FIGS. 2 and 3, the hydraulically operated valve 21 includes a valve body 25 connected in the inlet line 20 and having an intermediate passage 26 surrounded by a valve seat 27. A valve head 28 on the downstream side of the central passage 26 is adapted to move into engagement with the seat 27 to close the valve, and from engagement with the seat to open the valve. Such positions are determined by the pressure of the water on the upstream side of the valve, which is either permitted to enter a chamber 29 in a valve cap 30 for action upon the valve head 28 and a diaphragm 31 secured to the valve head and to surrounding body 25. When the water pressure is allowed to enter the chamber 29, it will move the diaphragm 31 and the attached valve head 28 into engagement with the seat 27 to close the valve. On the other hand, when the chamber 29 is connected to atmosphere, then the water pressure on the upstream side of the valve head 28 will shift it and the diaphragm 31 way from the seat 27, or to an open condition. The area of the valve seat 27 is much less than the effective area of the diaphragm 31 so that even though equal and opposite unit pressures are acting on the valve head 28 and on the diaphragm, the fact that the pressure in the chamber 29 is acting over a greater diaphragm area will insure the engagement of the valve head 28 with the valve seat 27.

The open or closed condition of the diaphragm valve is determined by the level of water in the cooling tower basin 12, which acts through the float 23 upon the pilot valve 24, as shown somewhat diagrammatically in FIGS. 2 and 3. The pilot valve body 32 has a pressure inlet passage 33 communicating through a pressure line 34 with the upstream side of the valve body 25. The pilot valve also has a passage 35 communicating through a fluid line 36 with the valve chamber 29. It also has a third or exhaust passage 37 communicating with the atmosphere. The passage 35 leading to the valve chamber is adapted to be placed selectively in communication with the inlet passage 33, so that the chamber will be subject to the water pressure on the upstream side of the valve body 25, or in communication with the exhaust passage 37, in which the chamber pressure will be at atmospheric, depending upon the position of a pilot valve head 38 movable in the valve body 32 with respect to its several passages. This valve head 38 has an inlet passage 39 adapted to register with the passage 36 leading to the chamber 29, and when so registered will also be in communication with the inlet passage 33 connected to the upstream side of the valve body 25. The pilot valve head 38 also has an exhaust passage 40 therein (FIG. 3) adapted to be placed in simultaneous communication with the passage 35 leading to the chamber 29 and with the exhaust passage 37 of the pilot valve body, in which the chamber is connected to atmosphere.

By rotating the pilot valve head 38, it can either be placed in the position shown in FIG. 2 in which the water pressure in the inlet line 20, 34 will hold the valve closed, or it can be turned to the position shown in FIG. 3, in which the chamber 29 is connected to the atmosphere, allowing the water pressure in the valve body 25 to shift the valve head 28 and diaphragm 31 to an open condition. The shifting of the pilot valve head 38 between the two positions described above is dependent upon the level of water in the cooling tower basin 12 and of the float 23 buoyant therein. This float is connected to an actuating rod 41 which is pin-connected to a pair of links or arms 42, 43, one of which 42 is pivoted to a suitable support 44, that may be an extension of the pilot valve housing or body 32, and the other of which 43 is secured to the pilot valve head 38.

When the float 23 is in the lower position, the pilot valve head 38 will be disposed in the position illustrated in FIG. 3, in which the valve is open and water is allowed to flow from the inlet line 20 through the valve 21 and flow controller orifices 22 at a substantially constant rate into the cooling tower basin 12. When the water level in the basin rises to a predetermined value, the float 23 will rise with it and will rotate the pilot valve head 38 to the position shown in FIG. 2, in which the water pressure is allowed to enter the chamber 29, shifting the valve head 28 to closed position against its seat 27, thereby closing the hydraulically operated valve 21 and causing a cessation in the addition of make-up water to the cooling tower 10.

During the flow of the make-up water in the cooling tower 10, chemicals in a predetermined proportion or ratio with respect to the quantity of make-up water added are also fed into the cooling tower basin 12. The particular chemical or chemicals added can vary, depending upon the requirements of the system, which is also true of the proportion of each chemical added. Moreover, the specific feed pumps for introducing the chemicals into the cooling tower basin can also be varied from those specifically illustrated, which are shown herein by way of example only. It is sufficient to state that any suitable feed pump arrangement will operate so long as it introduces the desired chemicals in the proper ratio to the quantity of make-up water added to the cooling tower.

As specifically illustrated, a chemical to be added can be contained in a suitable feed tank 50 located externally of the basin 12, the chemical passing through a suction line 51, that may have a suitable control valve 52 therein, into a positive displacement pump 53 operated by an electric motor 54. The chemical discharges from the pump 53 through a discharge line 55 into the cooling tower basin 12. The pump 53 operates only during the time that make-up water is flowing through the inlet pipe 20. When the hydraulically operated valve 21 opens to allow water to flow through the pipe 20, the water passes through a flow switch 56 mounted in the line (see FIGS. 1 and 4), striking a paddle 57 and deflecting or tilting the paddle toward the downstream side of the flow control switch. Such deflection or tilting rocks an arm 58 carrying a pair of switch contacts 59 into engagement with another pair of fixed contacts 60 of the flow controlled switch. When a main switch 61 is closed, current can then flow through the electric lines 62 connecting the fixed contacts 60 with the electric motor 54, the latter then rotating. When the flow through the water inlet pipe 20 ceases, the paddle 57 moves back to its initial position, rocking the movable contacts 59 out of engagement with the fixed contacts 60 and opening the circuit to the electric motor 54, which then stops.

It is, accordingly, apparent that the electric motor 54 only operates during the time that water is flowing through the inlet line 20. Accordingly, the chemical in the feed tank 50 is only being pumped into the cooling tower basin 12 during the time that the electric motor is operating, which is only during the time that make-up water is being added to the cooling tower 10.

The flow of water through the inlet line and into the cooling tower also causes operation of another pump 70, to feed another chemical into the cooling tower basin. Such chemical may, by way of example, be an acid contained within a suitable tank or carboy 71 mounted externally of the basin. The pump 70 disclosed is of the aspirator type and is operated by some of the make-up water flowing through it and into the basin 12. As shown, a suction line 72 is connected to the acid tank or carboy 71 and runs therefrom through a filter 73 (FIG. 5) and a suitable valve or stopcock 74, discharging from a drop indicator 75 contained within a transparent or glass housing 76. The chemical can then be drawn through a suitable line 77 and an upwardly closing check valve 78 into an aspirator housing 79 that may have a suitable air vent or vacuum breaker 80.

The suction in the aspirator 70 is provided by some of the make-up water, which flows through a control valve 81, that may be set at a desired open condition, and through a water inlet line 82 into the aspirator housing 79. This inlet line has an outlet 83 disposed at the upper end of the flared mouth 84 of a discharge pipe 85 connected to a tube 86 that discharges into the cooling tower basin 12. As the water flows from the aspirator outlet 83 into the flared end 84 of the pipe 85, it creates a suction at the mouth 84 of the pipe or tube, which will draw the acid or other chemical into the aspirator housing 79 and into the suction inlet 84 for discharge with the water through the pipe 86 into the cooling tower basin 12. By appropriate setting of the valve 74, the proportion of chemical fed from the tank 71 into the basin 12 can be accurately determined.

When the water in the cooling tower basin 12 has risen to the desired level, it will close the hydraulically operated valve 21, whereupon no water will pass through the aspirator 70, causing a stoppage in the feeding of chemical from the tank 71 into the cooling tower basin.

In addition to feeding one or a plurality of different chemicals, in a desired proportion to the make-up water, into the cooling tower basin 12, the present system also bleeds off a certain proportion of the recirculated water in the system so as to avoid excessive concentration of minerals in the recirculated water. Such bleed-off occurs simultaneously with the opening of the hydraulically operated valve 21, which allows the introduction of make-up water into the cooling tower, and continues until the hydraulically operated valve 21 is closed, whereupon the bleed-off ceases. As shown, a bleed-off line 90 is connected to the water return line 18 leading to the distribution header 19, this line having a suitable manually operated control valve 91 that can be adjusted to provide for a certain flow of water therethrough. The water also flows through a hydraulically operated valve 92 that may be the same as the hydraulically operated valve 21 that determines the flow of make-up water. From the hydraulically operated bleed-off valve 92, the water passes through a line 93 and through an orifice cap 94 connected thereto into a suitable sump or drain pipe (not shown).

The hydraulically operated bleed-off valve 92 can be the same valve illustrated in FIGS. 2 and 3. It has a chamber into which water pressure from the make-up line 20 can pass for the purpose of closing the bleed-off valve 92, or such chamber can be connected to atmosphere so as to cause the water pressure in the bleed-off line 90 to open the valve. Such closed or opened condition occurs simultaneously with the closed or opened condition in the make-up valve 21. As disclosed, a fluid line 95 is connected at one end to the chamber of the bleed-off valve 92, the other end of this line being connected to the chamber 29 of the make-up water valve or to the line 36 connected to this latter chamber. Because of the line 95 interconnecting the two valve chambers, they will have the same condition at the same time, either being under pressure when the pilot valve 24 is in the position shown in FIG. 2, or in the exhaust condition communicating with the atmosphere when the pilot valve is in the position shown in FIG. 3. Thus, the single pilot valve 24 that is selectively shifted between the position shown in FIG. 2 and the position shown in FIG. 3 will determine the simultaneous closed condition or opened condition of both the make-up water valve 21 and the bleed-off water valve 92. Accordingly, when the level of water in the cooling tower basin 12 has dropped to the predetermined extent, causing a corresponding lowering of the float 23, the pilot valve 24 will shift to the FIG. 3 condition, in which the chambers of both valve 21, 92 are connected to atmosphere, whereupon the pressure of the make-up water in the make-up line 20 will open the make-up water valve 21 and the pressure of the water in the recirculated water line 18 will open the bleed-off valve 92. Accordingly, there will be a simultaneous flow of make-up water into the cooling tower 10, and there will be a simultaneous dumping or bleeding off of the recirculated water to the sump or drain pipe. By suitably setting the valve 91 and selecting the size of the orifice or opening in the orifice cap 94, the proportion of water bled off the system to the quantity of make-up water entering the system can be preselected.

The rate at which the make-up water is added to the cooling tower is greater than the quantity of water bled off into the sump or drain pipe. Accordingly, when the level of water in the basin rises to the predetermined extent, carrying the float 23 upwardly with it, the pilot valve 24 is shifted to the position shown in FIG. 2, which will then place the pressure chambers of both diaphragm valves 21, 92 in communication with the pressure on the upstream side of the make-up water valve 21, causing such pressure to close both valves 21, 92 and producing a cessation of the addition of make-up water and of the bleeding off recirculated water from the system. As noted above, the stopping of the flow of water through the make-up line 20 will also cause the electric motor 54 and its pump 53 to cease feeding chemical to the cooling tower, and the aspirator 70 to discontinue feeding the chemical from the other tank 71 into the cooling tower 10.

By virtue of the present invention, the proportion of chemicals to make-up water fed into the system is accurately controlled, as well as the quantity of water bled off from the system, all in a comparatively simple, automatic manner and with the use of equipment that is comparatively inexpensive.

We claim:

1. In a water conditioning system: an apparatus for recirculating water; means for feeding make-up water to said apparatus at a substantially constant rate; bleed-off means for removing water from said apparatus; means for feeding a chemical to said apparatus; and means operating simultaneously with flow of water in said make-up water means for operating said bleed-off means and said chemical feeding means to bleed off water at a predetermined ratio to the quantity of make-up water fed to the apparatus and to feed chemical at a predetermined ratio to the quantity of make-up water fed to the apparatus.

2. In a water conditioning system: an apparatus for recirculating water and including a water reservoir; means for adding make-up water to said reservoir at a substantially constant rate; bleed-off means for removing water from said apparatus; means for feeding a chemical to said apparatus; means operating simultaneously with flow of water in said make-up water means for operating said bleed-off means and said chemical feed means to bleed off water at a predetermined ratio to the quantity of make-up water fed to the apparatus and to feed chemical at a predetermined ratio to the quantity of make-up water fed to the apparatus; and means responsive to the level of water in said reservoir for controlling the flow of water through said make-up water means.

3. In a water conditioning system: an apparatus for recirculating water; means for feeding make-up water to said apparatus at a substantially constant rate; bleed-off means for removing water from said apparatus; means for feeding a chemical to said apparatus, including a pump for such chemical, an electric motor for operating said pump and an electric circuit to said motor; means for controlling the flow of water through said make-up water feeding means; means operating in response to flow of water in said make-up water feeding means for closing said circuit and for opening said circuit when such flow of water ceases, whereby chemical is fed to the apparatus at a predetermined ratio to the quantity of make-up water fed to the apparatus; and means operating simultaneously with flow of water in said make-up water feeding means for operating said bleed-off means to control flow of water through said bleed-off means to bleed off water at a predetermined ratio to the quantity of make-up water fed to the apparatus.

4. In a water conditioning system: an apparatus for recirculating water and including a water reservoir; means for feeding make-up water to said reservoir at a substantially constant rate; bleed-off means for removing water from said apparatus; means for feeding a chemical to said apparatus, including a pump for such chemical, an electric motor for operating said pump and an electric circuit to said motor; means responsive to the level of water in said reservoir for controlling the flow of water through said make-up water feeding means; means operating in response to flow of water in said make-up water feeding means for closing said circuit and for opening said circuit when such flow of water ceases, whereby chemical is fed to the apparatus at a predetermined ratio to the quantity of make-up water fed to the reservoir; and means operating simultaneously with flow of water in said make-up water feeding means for operating said bleed-off means to control flow of water through said bleed-off means to bleed off water at a predetermined ratio to the quantity of make-up water fed to the reservoir.

5. In a water conditioning system: an apparatus for recirculating water; means for feeding make-up water to said apparatus at a substantially constant rate; bleed-off means for removing water from said apparatus; means for feeding a chemical to said apparatus, including a hydraulically operated pump for such chemical operating in response to flow of water in said make-up water feeding means, whereby chemical is fed to the apparatus at a predetermined ratio to the quantity of make-up water fed to the apparatus; means for controlling the flow of water through said make-up water feeding means; and means operating simultaneously with flow of water in said make-up water feeding means for operating said bleed-off means to control flow of water through said bleed-off means to bleed off water at a predetermined ratio to the quantity of make-up water fed to the apparatus.

6. In a water conditioning system: an apparatus for recirculating water and including a water reservoir; means for feeding make-up water to said reservoir at a substantially constant rate; bleed-off means for removing water from said apparatus; means for feeding a chemical to said apparatus, including a hydraulically operated pump for such chemical operating in response to flow of water in said make-up water feeding means, whereby chemical is fed to the apparatus at a predetermined ratio to the quantity of make-up water fed to the reservoir; means responsive to the level of water in said reservoir for controlling the flow of water through said make-up water means; and means operating simultaneously with flow of water in said make-up water feeding means for operating said bleed-off means to control flow of water through said bleed-off means to bleed off water at a predetermined ratio to the quantity of make-up water fed to the reservoir.

7. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; and means responsive to the level of water in said reservoir for operating said valves simultaneously between opened and closed conditions whereby make-up water is fed to said reservoir at a predetermined ratio to the water removed from said apparatus.

8. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; means responsive to the level of water in said reservoir for operating said valves simultaneously between opened and closed conditions whereby make-up water is fed to said reservoir at a predetermined ratio to the water removed from said apparatus; means for feeding a chemical to said reservoir; and means responsive to flow of water in said feed line for causing said chemical feeding means to deliver said chemical to said reservoir at a predetermined ratio to the make-up water added to said reservoir and to cease delivering chemical when flow of water in said feed line ceases.

9. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; first hydraulically responsive means for operating said first valve; second hydraulically responsive means for operating said second valve; and means responsive to the level of water in said reservoir for selectively directing fluid pressure simultaneously to both of said hydraulically responsive means or relieving both of said hydraulically responsive means of pressure, whereby said valves are simultaneously closed or opened to add make-up water to said reservoir at a predetermined ratio to the water removed from said apparatus.

10. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; first hydraulically responsive means for operating said first valve; second hydraulically responsive means for operating said second valve; means responsive to the level of water in said reservoir for selectively directing fluid pressure simultaneously to both of said hydraulically responsive means or relieving both of said hydraulically responsive means of pressure, whereby said valves are simultaneously closed or opened to add make-up water to said reservoir at a predetermined ratio to the water removed from said apparatus; means for feeding a chemical to said reservoir; and means responsive to flow of water in said feed line for causing said chemical feeding means to deliver said chemical to said reservoir at a predetermined ratio to the make-up water added to said reservoir and to cease delivering chemical when flow of water in said feed line ceases.

11. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; first hydraulically responsive means for operating said first valve; second hydraulically responsive means for operating said second valve; means responsive to the level of water in said reservoir for selectively directing fluid pressure simultaneously to both of said hydraulically responsive means or relieving both of said hydraulically responsive means of pressure, whereby said valves are simultaneously closed or opened to add make-up water to said reservoir at a predetermined ratio to the water removed from said apparatus; means for feeding a chemical to said reservoir, including a pump for such chemical, an electrical motor for operating said pump and an electric circuit to said motor; and means operating in response to flow of water in said feed line for closing said circuit and for opening said circuit when such flow of water ceases, whereby chemical is fed to the reservoir at a predetermined ratio to the make-up water added to the reservoir.

12. In a water conditioning system: an apparatus for recirculating water and including a water reservoir; a feed line for adding make-up water to said reservoir at a substantially constant rate; a first valve in said line; a bleed line for removing water from said apparatus; a second valve in said bleed line; first hydraulically responsive means for operating said first valve; second hydraulically responsive means for operating said second valve; means responsive to the level of water in said reservoir for selectively directing fluid pressure simultaneously to both of said hydraulically responsive means or relieving both of said hydraulically responsive means of pressure, whereby said valves are simultaneously closed or opened to add make-up water to said reservoir at a predetermined ratio to the water removed from said apparatus, means for feeding a chemical to said reservoir, including a hydraulically operated pump for such chemical operating in response to flow of water in said feed line for feeding such chemical to said reservoir when water is flowing in said feed line and to cease feeding such chemical to said reservoir when water ceases flowing in said feed line, whereby chemical is fed to the reservoir at a predetermined ratio to the make-up water added to the reservoir.

13. In a water conditioning system: an apparatus for recirculating water; means for feeding make-up water to said apparatus at a constant rate; bleed-off means for removing water from said apparatus at a constant rate; means for feeding a chemical to said apparatus; and means operating simultaneously with flow of water in said make-up water means for opening said bleed-off means and effecting actuation of said chemical feeding means and for closing said bleed-off means and discontinuing actuation of said chemical feeding means simultaneously with cessation of flow of water in said make-up water means, whereby water is removed from said apparatus at a predetermined ratio to the make-up water added to said apparatus and chemical is added to said apparatus at a predetermined ratio to the make-up water added to said apparatus.

14. In a water conditioning system: an apparatus for recirculating water and including a water reservoir; means for adding make-up water to said reservoir at a constant rate; bleed-off means for removing water from said apparatus at a constant rate; means for feeding a chemical to said apparatus; means operating simultaneously with flow of water in said make-up water means for opening said bleed-off means and effecting actuation of said chemical feeding means and for closing said bleed-off means and discontinuing actuation of said chemical feeding means simultaneously with cessation of flow of water in said make-up water means, whereby water is removed from said apparatus at a predetermined ratio to the make-up water added to said reservoir and chemical is added to said apparatus at a predetermined ratio to the make-up water added to said reservoir; and means responsive to the level of water in said reservoir for selectively permitting or preventing the flow of water through said make-up water means.

References Cited by the Examiner

UNITED STATES PATENTS

| 1,505,292 | 8/24 | Serrell | 137—98 |
| 2,780,357 | 2/57 | Robinson | 210—101 |
| 2,805,774 | 9/57 | Griswold | 210—110 |

FOREIGN PATENTS 2,741    1/88    Great Britain.

REUBEN FRIEDMAN, *Primary Examiner.*

FRANK W. LUTTER, EUGENE F. BLANCHARD,
*Examiners.*